(12) United States Patent
Waterfall et al.

(10) Patent No.: US 7,949,951 B1
(45) Date of Patent: May 24, 2011

(54) SELECTIVELY LIMITING PARAGRAPH RECOMPOSITION

(75) Inventors: Douglas Waterfall, Seattle, WA (US); David E. Williamson, Redmond, WA (US); Eric A. Menninga, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1118 days.

(21) Appl. No.: 11/624,162

(22) Filed: Jan. 17, 2007

(51) Int. Cl.
*G06F 17/00* (2006.01)

(52) U.S. Cl. ......... 715/273; 715/234; 715/243; 715/255

(58) Field of Classification Search ................... 715/209, 715/210, 226, 231, 234, 243, 246, 251, 255, 715/256, 273, 200–205, 229, 700, 760
See application file for complete search history.

(56) References Cited

U.S. PATENT DOCUMENTS

| | | | | |
|---|---|---|---|---|
| 5,287,443 | A * | 2/1994 | Mameda et al. | 715/201 |
| 5,625,773 | A * | 4/1997 | Bespalko et al. | 715/210 |
| 6,128,633 | A * | 10/2000 | Michelman et al. | 715/210 |
| 6,223,191 | B1 * | 4/2001 | Truelson | 715/205 |
| 6,647,533 | B1 * | 11/2003 | Liu et al. | 715/245 |
| 6,928,611 | B2 * | 8/2005 | McCully et al. | 715/245 |
| 7,020,838 | B2 * | 3/2006 | Tsykora | 715/241 |
| 7,168,037 | B2 * | 1/2007 | Shade et al. | 715/244 |
| 7,596,752 | B2 * | 9/2009 | Marks et al. | 715/255 |
| 2006/0129923 | A1 * | 6/2006 | Tsykora | 715/527 |
| 2006/0136818 | A1 * | 6/2006 | Burago et al. | 715/518 |
| 2007/0038928 | A1 * | 2/2007 | Marks et al. | 715/517 |

OTHER PUBLICATIONS

Knuth et al., "Software—Practice and Experience", 1981, vol. 11, pp. 1119-1184.*
K. Skoupy "Proposal for Text and Graphics Unification in a TEX-Based Framework".*

* cited by examiner

*Primary Examiner* — Maikhanh Nguyen
(74) *Attorney, Agent, or Firm* — Fish & Richardson P.C.

(57) ABSTRACT

Techniques are provided for text composition. In some implementations, a computer-implemented method is provided. The method includes receiving text to compose, the text including a plurality of paragraphs, and composing the text using paragraph composition, the paragraph composition determining a layout for the lines of each paragraph according to a line break scheme that determines line breaks for the paragraph as a whole. The method also includes, identifying limited recomposition for one or more paragraphs of the plurality of paragraphs, receiving a modification to a line of a paragraph, the paragraph having a plurality of lines and where the modified line is subsequent to a first line in the paragraph, determining whether the paragraph of the modified line is identified as having limited recomposition and, if the paragraph has limited recomposition, recomposing a portion of the paragraph using a multi-line paragraph composition process without recomposing the full paragraph.

27 Claims, 3 Drawing Sheets

SELECTIVELY LIMITING PARAGRAPH RECOMPOSITION

BACKGROUND

This specification relates to automated text composition.

Text composition includes laying out text within a frame of one or more pages of an electronic document. Text to be composed typically includes a number of individual paragraphs. Composition of the paragraphs includes a selection and a placement of line breaks to produce a visually pleasing appearance and positioning the paragraph within a page frame of the electronic document. Changes in the style of the text, e.g., fonts, formats, line heights, and point size, can complicate text composition. In addition, text styles and shape complexity can significantly increase computational overhead and processing time.

Techniques exist for determining line breaks in a paragraph (i.e., defining a paragraph layout) during text composition. For example, a single line composer determines line breaks in a line by line approach. Line by line techniques generally start with a first line, assign penalty values for possible breaks in that line, and choose the best possible line break for that line. After the first line is defined, a second line is analyzed and defined in a similar manner. Line by line techniques continue through a paragraph, defining each line and moving on to the next. Each paragraph is serially processed line by line until the entire text has been composed.

Another technique for determining line breaks is to use a paragraph composer. A paragraph composer considers each paragraph as a whole when determining line breaks for the paragraph. Consequently, a number of different line break schemes for the lines of the paragraph as a whole are considered. Each possible paragraph layout can have a penalty value. The paragraph composer selects the best paragraph layout (e.g., the line breaks for the lines of the paragraph that result in the lowest penalty). An example of composing paragraphs as a whole is described in U.S. Patent Application Publication No. 2003/0055851, which is incorporated by reference.

The composing information for each line, for example, the position of the line in the composition, the number of characters in the line, as well as line break data is stored in some software applications, e.g., in the Adobe® InDesign® application, in a structure referred to as a WaxLine. An undamaged WaxLine can be presented (e.g., displayed or printed). However, text associated with a damaged WaxLine must be recomposed to be presented. A WaxLine can become damaged, for example, by a modification in the line of text (e.g., as a result of a user input) or modifying a text frame.

To repair a damaged WaxLine, the paragraph composer generally backs up the composition from the line having the damaged WaxLine to the first line of the paragraph. The paragraph composer then recomposes the entire paragraph.

SUMMARY

Systems, methods, and apparatuses including computer program products are provided for text composition. In general, in one aspect, a computer-implemented method is provided. The method includes receiving text to compose, the text including a plurality of paragraphs and composing the text using paragraph composition process, the paragraph composition determining a layout for the lines of each paragraph according to a line break scheme that determines line breaks for the paragraph as a whole. The method includes identifying limited recomposition for one or more paragraphs of the plurality of paragraphs and receiving a modification to a line of a paragraph, the paragraph having a plurality of lines and where the modified line is subsequent to a first line in the paragraph. The method also includes determining whether the paragraph of the modified line is identified as having limited recomposition and, if the paragraph has limited recomposition, recomposing a portion of the paragraph using a multi-line paragraph composition process without recomposing the full paragraph.

Implementations of the method can include one or more of the following features. The method can further include receiving a user input limiting recomposition for a paragraph, where the user input flags a particular line in the paragraph preventing backing up the composition beyond the flagged line. The method can further include receiving a user input limiting recomposition for a paragraph, where the user input prevents backing up the composition beyond a modified line in the paragraph. The received modification can cause one or more damaged lines in the paragraph.

Recomposing the portion of the paragraph can include recomposing the damaged lines in the paragraph without recomposing undamaged previous lines in the paragraph. Recomposing the portion of the paragraph can include backing up the composition of the paragraph from a modified line by the amount allowed by the limited recomposition. Recomposing can include composing the modified line and each subsequent line in the paragraph. Recomposing can include composing the modified line and one or more previous lines in the paragraph. Multi-line composition can include determining line breaks for two or more lines of the paragraph according to a line breaking scheme that takes all the recomposed lines into account to identify an optimal layout.

In general, in one aspect, a computer program product encoded on a tangible program carrier is provided. The computer program product is operable to cause data processing apparatus to perform operations including receiving text to compose, the text including a plurality of paragraphs, composing the text using paragraph composition process, the paragraph composition determining a layout for each paragraph according to a line break scheme that determines line breaks for the paragraph as a whole, identifying limited recomposition for one or more paragraphs of the plurality of paragraphs, receiving a modification to a line of a paragraph, the paragraph having a plurality of lines and where the modified line is subsequent to a first line in the paragraph, determining whether the paragraph of the modified line is identified as having limited recomposition, and if the paragraph has limited recomposition, recomposing a portion of the paragraph using a multi-line paragraph composition process without recomposing the full paragraph.

In general, in one aspect, as system is provided. The system includes a user interface device and one or more computers operable to interact with the user interface device. The one or more computers are also operable to receive text to compose, the text including a plurality of paragraphs, compose the text using paragraph composition process, the paragraph composition determining a layout for each paragraph according to a line break scheme that determines line breaks for the paragraph as a whole, identify limited recomposition for one or more paragraphs of the plurality of paragraphs, receive a modification to a line of a paragraph, the paragraph having a plurality of lines and where the modified line is subsequent to a first line in the paragraph, determine whether the paragraph of the modified line is identified as having limited recomposition, and if the paragraph has limited recomposition, recompose a portion of the paragraph using a multi-line paragraph composition process without recomposing the full paragraph.

Implementations of the system can include one or more of the following features. The one or more computers can include a server operable to interact with the user interface device through a data communication network, and the user interface device is operable to interact with the server as a client. The user interface device can include a personal computer running a web browser or a mobile telephone running a wireless application protocol (WAP) browser. The one or more computers can include one personal computer, and the personal computer comprises the user interface device.

Particular embodiments of the subject matter described in this specification can be implemented to realize one or more of the following advantages. The user benefits from the use of a paragraph composer without having to recompose the entire paragraph when a line is modified. The user can selectively retain line breaking decisions for lines in a paragraph while recomposing other lines in the paragraph.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
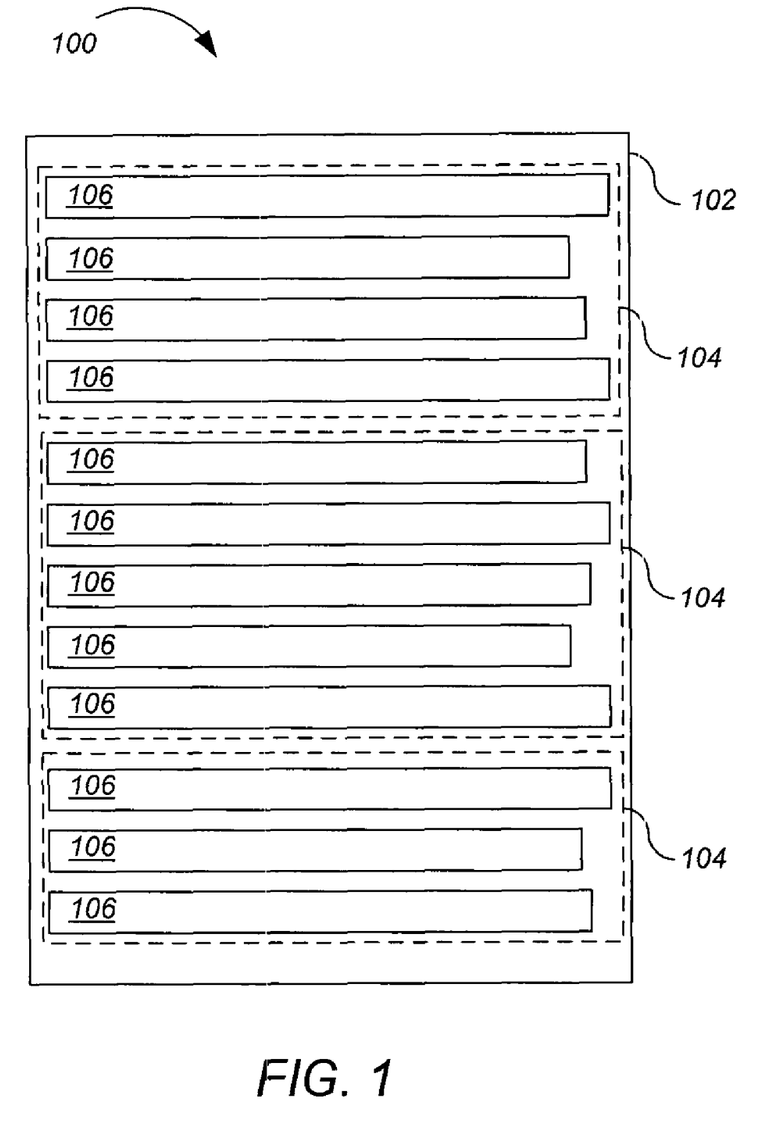
FIG. 1 is a block diagram illustrating composed text.

FIG. 1 is a block diagram 100 illustrating composed text. During composition, the text is composed with a frame 102, for example, a page frame for an electronic document. The frame represents a geometric area (e.g., on the page) that can contain composed text. The shape of the geometric area affects where text within the frame can be composed. The frame 102 includes a number of paragraphs 104. Each paragraph 104 includes a number of lines 106. The text is composed within the frame 102 using paragraph composition.

During paragraph composition, each paragraph 104 is sequentially laid out and positioned within the frame 102. The layout of each paragraph is determined according to a particular line breaking scheme that considers all the lines in the paragraph. Once a paragraph is composed, a line of the paragraph can become damaged due to a modification of that line or an earlier line. For example, the modification can alter how the line would be broken by the paragraph composer.

In some implementations, the paragraph composition generates composition data (e.g., a WaxLine) for each line in the composition. The composition data contains the composition information for the corresponding lines e.g., line break information. A modification to a line in a composed paragraph can damage one or more lines in the composition (e.g. damage one or more WaxLines).

For example, when composition data is stored as a WaxLine, adding or removing a word within the line or changing the characters of one or more words in the line can damage the WaxLine because the line break is no longer placed where the paragraph composer would place the break. Subsequent WaxLines can also become damaged as a change in the line break of one line changes the line breaking decisions for subsequent lines. Additionally, one or more WaxLines prior to the modified line in the paragraph can also become damaged as a result of the line modification. For example, a first word in the line can be changed such that it now fits in the previous line of the paragraph. For example, the width of the word can be decreased by editing such that the optimal break of the previous line includes the word. The editing can result in a shorter word, for example, by reducing the number of character or by character changes that reduce width (e.g., changing a "w" to an "l"). Consequently, the WaxLine of the line immediately prior to the modified line can also become damaged. The text of the damaged WaxLine is recomposed to repair the WaxLine.

Figure 2:
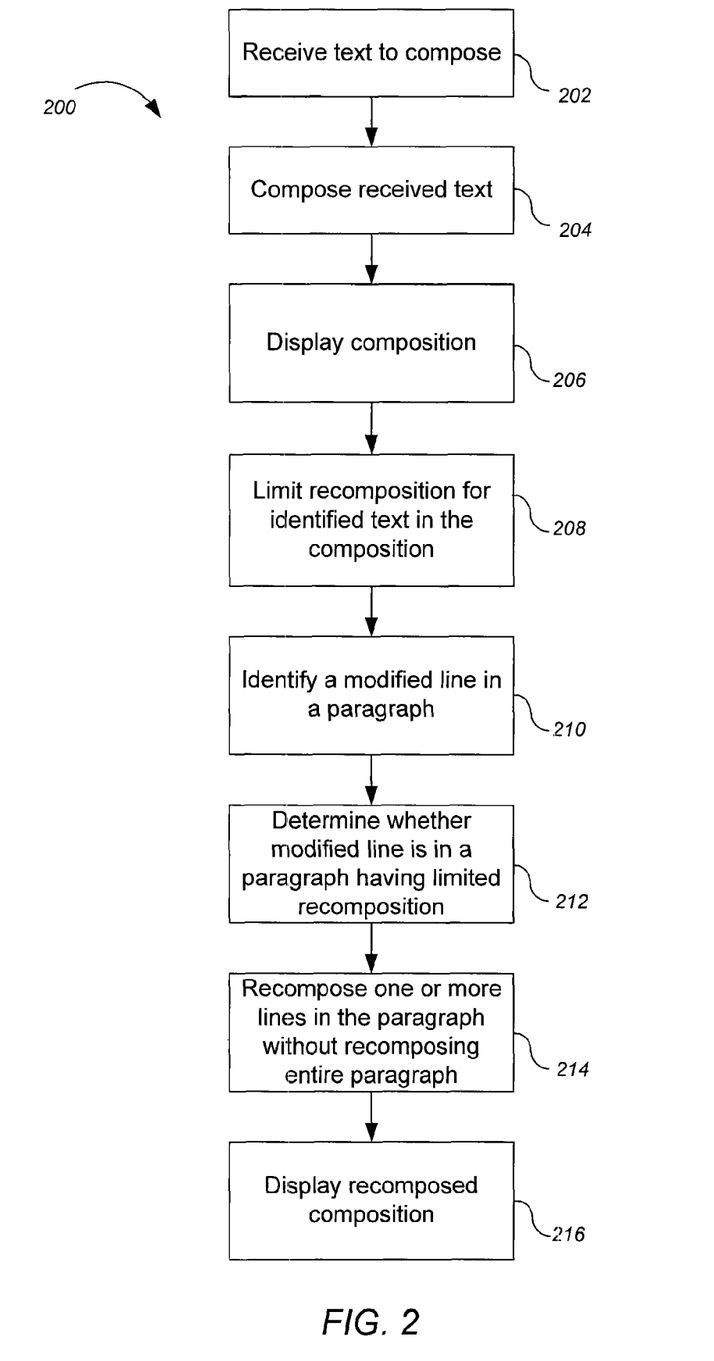
FIG. 2 illustrates an example process for recomposing text.

FIG. 2 illustrates an example process 200 for recomposing text. For convenience, the process will be described with reference to a computer system that performs the process 200 (e.g., as part of a publishing application).

The system receives text to compose (step 202). The text to compose is received, for example, as part of a file. The file can be locally stored or retrieved from a remote location. The text to compose can be received, for example, in response to a user selection of a particular file. Additionally, the system can include a publishing application in which text can be composed to fit one or more page frames (e.g., a layout for a book). The text can be generated by a user using the same or a different application. For example, the text can be generated using a first application and then imported into a second application for composition. The received text includes a number of individual paragraphs.

The system composes the received text (step 204). A paragraph composition process is applied to the text (e.g., using a paragraph composer). This process composes the text sequentially by paragraph. The composition of each paragraph includes determining the position of the paragraph within a frame and determining the paragraph layout (i.e., the layout of lines within a paragraph).

Determining the paragraph layout includes determining the line breaks for the lines of the paragraph. A line breaking scheme determines line breaks identifying an optimal paragraph layout. Instead of breaking lines independently line by line, the paragraph composer determines the line breaks in the context of the entire paragraph. For example, a number of possible line breaks for the paragraph can be calculated where each possible paragraph layout has an associated penalty value. In some implementations, the selected paragraph layout corresponds to the layout having the lowest penalty value. The individual lines are broken accordingly and the laid out paragraph is positioned within the frame. Each successive paragraph is similarly composed until the entire text has been composed.

The system displays the composition (step 206). For example, a publishing application can present the composed text on a screen of a display device. The composed text can be presented on one or more pages of a displayed electronic document. Additionally, the user can edit the electronic document properties (e.g., modifying document properties including the frame including width or position, changing wrapping properties, and changing alignment grids) and the text attributes (e.g., changing the Unicode value of a character and changing the paragraph or character attributes).

The system limits recomposition for identified text in the composition (step 208). In some implementations, the user selects one or more paragraphs to apply the limited recomposition. For example, the user can flag the selected paragraphs using one or more tools in the publishing application (e.g., a menu selection "limit composition behind the point of change"). In other implementations, the user can select a portion of a paragraph (e.g., one or more lines) as applying the limited recomposition only to the selected lines. In alternative implementations, the user can designate all of the text as having limited recomposition. The effect of limiting the recomposition for identified text limits the ability of the paragraph composer to back up the composition.

Limiting recomposition can include inserting a flag into the composition data (e.g., a WaxLine) for a line in a paragraph. The composition data can correspond to a line where a user insertion point was positioned. The flag can prevent backing up the composition beyond the flagged line. For example, for a paragraph having ten lines, the user may prefer the layout of the first five lines of the composition. Therefore, the user can fix the composition of those lines such that subsequent modifications to later lines will not result in changes to the composition of those first five lines. The user can insert the flag at line six, for example, by placing an insertion point in line six and selecting a menu option. The system honors the flag such that the composition is not backed up beyond line six during a recomposition process.

The system identifies a modified line in a paragraph (step 210). For example, a user can edit a line, e.g., insert or remove text that changes the length of the line. As a result of the modification, the optimal line break for the line may no longer be correct. For example, an increase in line length can result in a new break that moves one or more words to a next line in the paragraph. This, in turn, changes the optimal line break for the next line. Alternatively, the modification can result in a line that is shorter. As a result, the optimal line break can include additional words brought up from the next line in the paragraph. In another example, the modification to the line can change the optimal line break for a previous line in the paragraph.

In another example, the line modification results from changing other parameters associated with the line text. For example, changing a font, character size, or style (e.g., bold, italic) for one or more characters in the line can also change the line break. The modification results in a damaged line such that the line needs recomposing in order to provide a correct composition. In some implementations, the modified line results in one or more damaged WaxLines.

The system determines whether the modified line is within a paragraph having limited recomposition (step 212). If the modified line is within a paragraph that has been identified as having limited recomposition, the entire paragraph is not recomposed to account for the modified line. If the modified line is not within a paragraph having limited recomposition, the paragraph composer recomposes the entire paragraph as a whole.

The system recomposes one or more lines in the paragraph without recomposing the entire paragraph (step 214). In some implementations, the paragraph composer attempts to back up the composition. Generally, the paragraph composer would back up the composition to the beginning of the paragraph. In some implementations, the composer is tasked to compose beginning with the first damaged line in the paragraph. If the damaged line is not the first line in the paragraph, the composer attempts to back up the composition to damage the first line of the paragraph. The composer can then recompose beginning with the first damaged line (now the first line) of the paragraph. However, under particular circumstances, for example, when the composer identifies a table character, because of controlling code, or when the modified line has been identified as limiting composition, the ability of the composer to back up the composition can be prevented or limited.

For example, the paragraph composer can be prevented from backing up the composition from the modified line. As a result, the recomposition begins with the modified line, leaving the composition of the prior lines in the paragraph unchanged. The paragraph composer recomposes the remaining lines in the paragraph using a multi-line composing process. The multi-line composition is similar to composing a paragraph in that the line breaks are determined taking into account the overall effect of the line breaking scheme on more than one line.

For example, if there are three lines in the paragraph following the modified line, the multi-line composer determines an optimal line break for the four lines of the paragraph, leaving the earlier lines of the paragraph alone. Penalty values can be associated with different layouts for the lines and the line breaks can be determined according to a lowest penalty. An example of multi-line composition is shown in U.S. Pat. No. 6,510,441, which is incorporated by reference.

In some alternative implementations, the paragraph composer backs up the composition by a predefined number of lines. For example, the backup can be limited to an integer number of lines (e.g., one line), or to an identified point in the paragraph (e.g., a flagged line). This allows for recomposition of some previous lines without recomposing the entire paragraph.

After backing up the composition by the specified number of lines in the paragraph, the composer recomposes that line and each subsequent line in the paragraph using the multi-line composition process as described above. Consequently, any lines prior to the back up point remain unchanged from the line breaks determined during the original paragraph composition. However, the lines from the back up point on can have different line breaks according to the recomposition.

In some implementations, the modified line is composed independently, e.g., as by single line composer. The recomposition includes determining the line break for the modified line. The line break is determined according to a line breaking scheme considering only the modified line. For example, potential penalty values can be considered for different line breaks. The line break resulting in the lowest line penalty can be selected. The composer then moves forward to the next line in the paragraph. Each remaining line in the paragraph is recomposed line by line, e.g., because the recomposed modified line changed the line breaking for one or more of the subsequent lines.

In some implementations, the recomposition repairs one or more damaged WaxLines. The paragraph composer recomposes the modified line in order to correct the damaged WaxLine. Using the multi-line composer, the modified line and each subsequent line in the paragraph are recomposed. The recomposition repairs the damaged WaxLine of the modified line. In addition, if the selected layout for the lines changes the line breaks, the other WaxLines are corrected according to the new layout. Consequently, following recomposition there are no damaged WaxLines in the paragraph. The undamaged WaxLines prior to the modified line are unchanged, thus the line breaks according to the original paragraph composition of those line are retained.

The system displays the recomposed composition (step 216). For example, the publishing application can present the composition on a screen of a display device. The composed and recomposed text can be presented on one or more pages of a displayed electronic document. A user can view the final composition within a defined page frame of the electronic document.

Figure 3A:
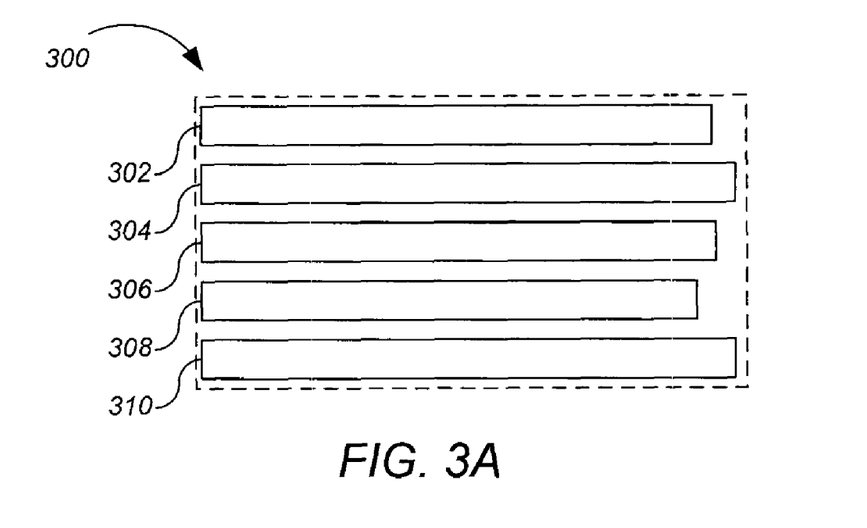
FIG. 3A is a block diagram illustrating an example composed paragraph prior to recomposition.

FIG. 3A is a block diagram illustrating an example composed paragraph 300 prior to recomposition. The composed paragraph 300 includes lines 302, 304, 306, 308, and 310. The line breaks for each line 302-310 were determined using paragraph composition. Thus, the lines 302-310 were considered as a whole in determining the layout for the composed paragraph 300. A user can edit one of the lines 302-310, for example, line 306, to form a modified line. The modified line can result in a damaged line (e.g., a damaged WaxLine) such that the line needs recomposed.

Figure 3B:
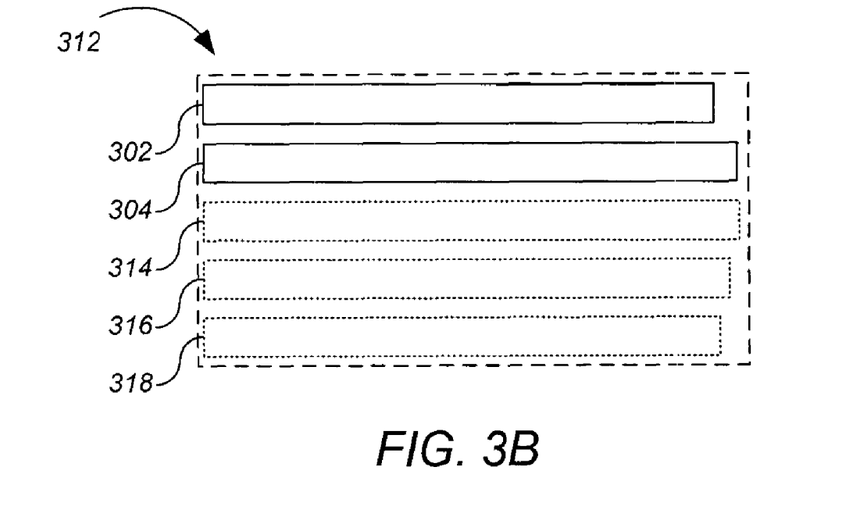
FIG. 3B is a block diagram illustrating an example recomposed paragraph.

FIG. 3B is a block diagram illustrating an example recomposed paragraph 312. The modification of line 306 in FIG. 3A requires recomposition of the paragraph 300. Assuming the recomposition has been limited such that the composer cannot back up the composition beyond the modified line, original lines 302 and 304 are unchanged. For example, there can be a flag on the WaxLine for line 306 which prevents the composer from backing up beyond line 306. The recomposition takes account of the remaining lines in the paragraph in order to form recomposed lines 314, 316, and 318. The recomposition of the modified line and the subsequent lines of the paragraph defines a layout that can be different from the layout of the lines in the original paragraph. For example, FIG. 3B shows that recomposed line 314 has a different width as a result of a new line break applied to the modified line 304. Furthermore, the lines 316 and 318 can have different line breaking points than lines 308 and 310 of paragraph 300.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving text to compose, the text including a plurality of paragraphs;
   composing the text using paragraph composition, the paragraph composition determining a layout for the lines of each paragraph according to a line break scheme that determines line breaks for the paragraph as a whole;
   designating one or more paragraphs of the plurality of paragraphs as having limited recomposition;
   receiving a modification to a line of a paragraph, the paragraph having a plurality of lines and where the modified line is subsequent to a first line in the paragraph;
   determining whether the paragraph of the modified line has limited recomposition;
   if the paragraph has limited recomposition, recomposing a portion of the paragraph using a multi-line paragraph composition process without recomposing the full paragraph; and
   if the paragraph does not have limited recomposition, recomposing the full paragraph,
   wherein the designating further comprises receiving a user input limiting recomposition for the paragraph, where the user input flags one or more particular lines in the paragraph preventing backing up the composition beyond the flagged one or more lines.

2. The method of claim 1, where the designating further comprises:
   receiving a user input limiting recomposition for a paragraph, where the user input prevents backing up the composition beyond a modified line in the paragraph.

3. The method of claim 1, where the received modification causes one or more damaged lines in the paragraph.

4. The method of claim 3, where recomposing the portion of the paragraph includes recomposing the damaged lines in the paragraph without recomposing undamaged previous lines in the paragraph.

5. The method of claim 1, where recomposing the portion of the paragraph includes backing up the composition of the paragraph from a modified line by an amount allowed by the limited recomposition.

6. The method of claim 1, where recomposing includes composing a modified line and each subsequent line in the paragraph.

7. The method of claim 1, where recomposing includes composing a modified line and one or more previous lines in the paragraph.

8. The method of claim 1, where multi-line composition includes determining line breaks for two or more lines of the paragraph according to a line breaking scheme that takes all the recomposed lines into account to identify an optimal layout.

9. A computer program product, encoded on a non-transitory computer-readable storage medium configured by a processor to cause a data processing apparatus to perform operations comprising:
   receiving text to compose, the text including a plurality of paragraphs;
   composing the text using paragraph composition, the paragraph composition determining a layout for each paragraph according to a line break scheme that determines line breaks for the paragraph as a whole;
   designating one or more paragraphs of the plurality of paragraphs as having limited recomposition;
   receiving a modification to a line of a paragraph, the paragraph having a plurality of lines and where the modified line is subsequent to a first line in the paragraph;
   determining whether the paragraph of the modified has limited recomposition;
   if the paragraph has limited recomposition, recomposing a portion of the paragraph using a multi-line paragraph composition process without recomposing the full paragraph; and
   if the paragraph does not have limited recomposition, recomposing the full paragraph,
   wherein the designating further comprises receiving a user input limiting recomposition for the paragraph, where the user input flags one or more particular lines in the paragraph preventing backing up the composition beyond the flagged one or more lines.

10. The computer program product of claim 9, where the designating further comprises:
    receiving a user input limiting recomposition for a paragraph, where the user input prevents backing up the composition beyond a modified line in the paragraph.

11. The computer program product of claim 9, where the received modification causes one or more damaged lines in the paragraph.

12. The computer program product of claim 11, where recomposing the portion of the paragraph includes recomposing the damaged lines in the paragraph without recomposing undamaged previous lines in the paragraph.

13. The computer program product of claim 9, where recomposing the portion of the paragraph includes backing up the composition of the paragraph from the modified line by an amount allowed by the limited recomposition.

14. The computer program product of claim 9, where recomposing includes composing the modified line and each subsequent line in the paragraph.

15. The computer program product of claim 9, where recomposing includes composing the modified line and one or more previous lines in the paragraph.

16. The computer program product of claim 9, where multi-line composition includes determining line breaks for two or more lines of the paragraph according to a line breaking scheme that takes all the recomposed lines into account to identify an optimal layout.

17. A system comprising:
   a user interface device; and
   one or more computers configured to interact with the user interface device and to:
      receive text to compose, the text including a plurality of paragraphs;
      compose the text using paragraph composition, the paragraph composition determining a layout for each paragraph according to a line break scheme that determines line breaks for the paragraph as a whole;
      designate one or more paragraphs of the plurality of paragraphs as having limited recomposition;
      receive a modification to a line of a paragraph, the paragraph having a plurality of lines and where the modified line is subsequent to a first line in the paragraph;
      determine whether the paragraph of the modified line has limited recomposition;
      if the paragraph has limited recomposition, recompose a portion of the paragraph using a multi-line paragraph composition process without recomposing the full paragraph; and
      if the paragraph does not have limited recomposition, recomposing the full paragraph,
      wherein the designating further comprises receiving a user input limiting recomposition for the paragraph, where the user input flags one or more particular lines in the paragraph preventing backing up the composition beyond the flagged one or more lines.

18. The system of claim 17, wherein the one or more computers comprise a server configured to interact with the user interface device through a data communication network, and the user interface device is configured to interact with the server as a client.

19. The system of claim 18, wherein the user interface device comprises a personal computer running a web browser or a mobile telephone running a wireless application protocol "WAP" browser.

20. The system of claim 17, wherein the one or more computers comprises one personal computer, and the personal computer comprises the user interface device.

21. The system of claim 17, where the designating further comprises:
   receiving a user input limiting recomposition for a paragraph, where the user input prevents backing up the composition beyond a modified line in the paragraph.

22. The system of claim 17, where the received modification causes one or more damaged lines in the paragraph.

23. The system of claim 22, where recomposing the portion of the paragraph includes recomposing the damaged lines in the paragraph without recomposing undamaged previous lines in the paragraph.

24. The system of claim 17, where recomposing the portion of the paragraph includes backing up the composition of the paragraph from the modified line by an amount allowed by the limited recomposition.

25. The system of claim 17, where recomposing includes composing the modified line and each subsequent system in the paragraph.

26. The system of claim 17, where recomposing includes composing the modified line and one or more previous lines in the paragraph.

27. The system of claim 17, where multi-line composition includes determining line breaks for two or more lines of the paragraph according to a line breaking scheme that takes all the recomposed lines into account to identify an optimal layout.

\* \* \* \* \*

UNITED STATES PATENT AND TRADEMARK OFFICE
CERTIFICATE OF CORRECTION

PATENT NO. : 7,949,951 B1  
APPLICATION NO. : 11/624162  
DATED : May 24, 2011  
INVENTOR(S) : Douglas Waterfall, David E. Williamson and Eric A. Menninga Page 1 of 1

It is certified that error appears in the above-identified patent and that said Letters Patent is hereby corrected as shown below:

Column 10, Line 19 at Claim 5; replace:
        "paragraph from a modified line by an amount allowed by the" with
        -- paragraph from the modified line by an amount allowed by the --

Column 10, Line 22 at Claim 6; replace:
        "composing a modified line and each subsequent line in the" with
        -- composing the modified line and each subsequent line in the --

Column 10, Line 25 at Claim 7; replace:
        "composing a modified line and one or more previous lines in" with
        -- composing the modified line and one or more previous lines in --

Column 10, Line 33 at Claim 9; replace:
        "tory computer-readable storage medium configured by a pro-" with
        -- tory computer-readable storage medium, configured by a pro- --

Column 10, Line 47 at Claim 9; replace:
        "determining whether the paragraph of the modified has" with
        -- determining whether the paragraph of the modified line has --

Signed and Sealed this  
Nineteenth Day of July, 2011

David J. Kappos  
*Director of the United States Patent and Trademark Office*